US005496146A

United States Patent [19]

Thomas et al.

[11] Patent Number: 5,496,146
[45] Date of Patent: Mar. 5, 1996

[54] STEEL SLAB AND COIL CARRIER

[75] Inventors: Dennis R. Thomas; Paul A. Kane, both of Peoria, Ill.

[73] Assignee: Kress Corporation, Brimfield, Ill.

[21] Appl. No.: 325,799

[22] Filed: Oct. 19, 1994

[51] Int. Cl.⁶ .................. B60P 3/00; B60P 3/42
[52] U.S. Cl. .................. 414/460; 414/910; 414/912; 414/684
[58] Field of Search .................. 414/23, 459, 460, 414/461, 539, 555, 626, 684, 910, 912; 294/81.61

[56] References Cited

U.S. PATENT DOCUMENTS

| | | | |
|---|---|---|---|
| 2,758,734 | 8/1956 | Westling | 414/459 X |
| 2,959,310 | 11/1960 | Meister, Jr. | 414/459 |
| 3,315,829 | 4/1967 | Cellini | 414/460 X |
| 3,627,351 | 12/1971 | Zimmerman et al. | 414/555 X |
| 3,834,566 | 9/1974 | Hilfiker | 414/910 X |
| 3,863,785 | 2/1975 | Brock | 414/910 X |
| 3,908,845 | 9/1975 | Bolt | 414/910 X |
| 3,921,833 | 11/1975 | Groos | 414/684 |
| 4,221,525 | 9/1980 | Stedman | 414/460 |
| 4,286,915 | 9/1981 | La Berdia | 414/460 |
| 4,761,108 | 8/1988 | Kress et al. | 414/460 |

*Primary Examiner*—Michael S. Huppert
*Assistant Examiner*—James W. Keenan
*Attorney, Agent, or Firm*—Leydig, Voit & Mayer, Ltd.

[57] ABSTRACT

An apparatus attached to a main frame of a vehicle for handling straddled loads including coil-shaped loads and slab-shaped loads entered into a load carrying space of the vehicle. The apparatus includes a moveable lift frame having both a tong assembly and probe assembly suspended therefrom. The tong assembly includes tong actuators and depending tongs for clamping a slab-shaped load, while the probe assembly includes a displaceable probe for penetrating coil shaped loads. When the apparatus is used for engaging a slab-shaped load, the probe is displaced so as to be withdrawn from the load carrying space, and the depending tongs are actuated to clamp the load. When the apparatus is used for engaging a coil shaped load, the probe is displaced into the load carrying space and the vehicle is moved to penetrate the load with the probe. With either load, the lift frame is then raised to elevate the engaged load.

30 Claims, 11 Drawing Sheets

STEEL SLAB AND COIL CARRIER

FIELD OF THE INVENTION

The present invention relates generally to mechanisms for handling heavy loads, and more particularly to an improved vehicle incorporating a mechanism for lifting, supporting and transporting heavy loads including steel slabs and coils.

BACKGROUND OF THE INVENTION

U.S. Pat. Nos. 4,170,434, 4,488,848 and 4,601,630 to Kress et al., assigned to the same assignee as the present invention, disclose vehicles that handle heavy loads. Vehicles constructed in accordance with these patents have proven themselves in the field for reliably and efficiently handling the lifting and transporting of straddled loads consisting of steel slabs and billets on the order of 100–150 tons.

However, as a result of their characteristic tong-type load clamping mechanisms, such vehicles are primarily arranged for handling slab-shaped loads, and are unsuitable for effectively engaging coil-shaped loads. This limits the usefulness of the vehicle, necessitating separate coil-handling and slab-handling vehicles at sites having both types of loads.

OBJECTS AND SUMMARY OF THE INVENTION

Accordingly, it is an object of the present invention to provide an improved load handling apparatus that is suitable for handling an increased variety of heavy loads including slab-shaped and coil-shaped loads.

It is another object to provide an apparatus as characterized above that readily transforms to function as either a slab carrier or a coil carrier according to the type of load to be handled.

It is also an object to provide an apparatus of the above kind that may be incorporated into several different types of load-handling vehicles.

It is another object to provide an apparatus of the above kind that may be retrofit to existing slab carrying vehicles.

It is yet another object to provide an apparatus of the above kind that may be incorporated within the overall dimensions of existing slab carrying vehicles.

Briefly, the invention provides a load handling apparatus attached to a main frame of a vehicle for handling loads, including loads which are suitable for being penetrated and loads suitable for being clamped. The loads are entered into a load carrying space of the vehicle. The apparatus includes a lift frame that is moveable relative to the main frame between a raised position and a lowered position. The difference in elevation of the lift frame relative to the main frame between the lowered and raised positions provides the lifting capability of the lift frame.

A tong assembly is suspended from the lift frame thereby enabling vertical movement up and down relative to the main frame. The tong assembly includes at least one tong actuator and a pair of depending tongs for gripping and carrying a load entered into the load carrying space. A probe assembly is also connected to the lift frame for vertical movement up and down relative to the main frame. The probe assembly includes a displaceable probe having a first position within the load carrying space and a second position substantially withdrawn from the load carrying space.

Means are provided for moving the probe between the first position for penetrating a first type of load suitable for penetration, such as a coil, being entered into the load carrying space, and for moving the probe to the second position for avoiding other types of loads entered into the load carrying space. Means are also provided for actuating the tong assembly for clamping the depending tongs onto a load suitable for clamping, such as a stack of steel slabs, entered into the load carrying space. In addition, means are provided for actuating the lift frame to raise and lower the probe assembly and tong assembly relative to the main frame, thereby lifting the clamped or penetrated load in the load carrying space.

In a preferred embodiment, the probe is pivoted downwardly into the load carrying space for penetrating a load, or pivoted upwardly above the load carrying space for avoiding other types of loads. The means for moving the probe, the means for actuating the tong assembly and the means for actuating the lift frame preferably include hydraulic cylinder and piston combinations controlled by a hydraulic system. Other objects and advantages will become apparent from the following detailed description when taken in conjunction with the attached drawings, in which:

Figure 1:
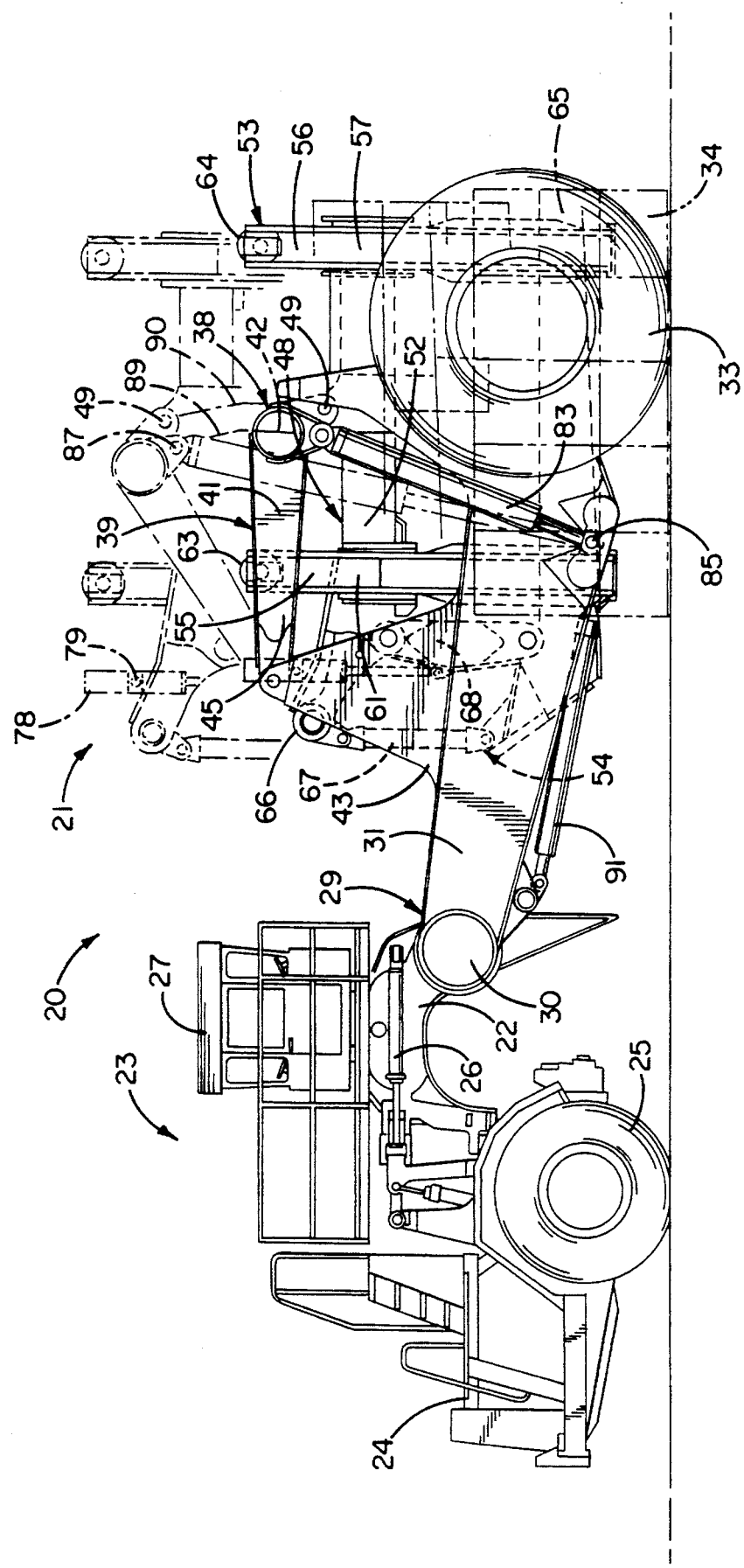
FIG. 1 is a side elevational view of a representative type of vehicle incorporating a lifting mechanism constructed in accordance with the present invention and illustrating a probe assembly in a lowered position to handle a coil-shaped load.
Figure 2:
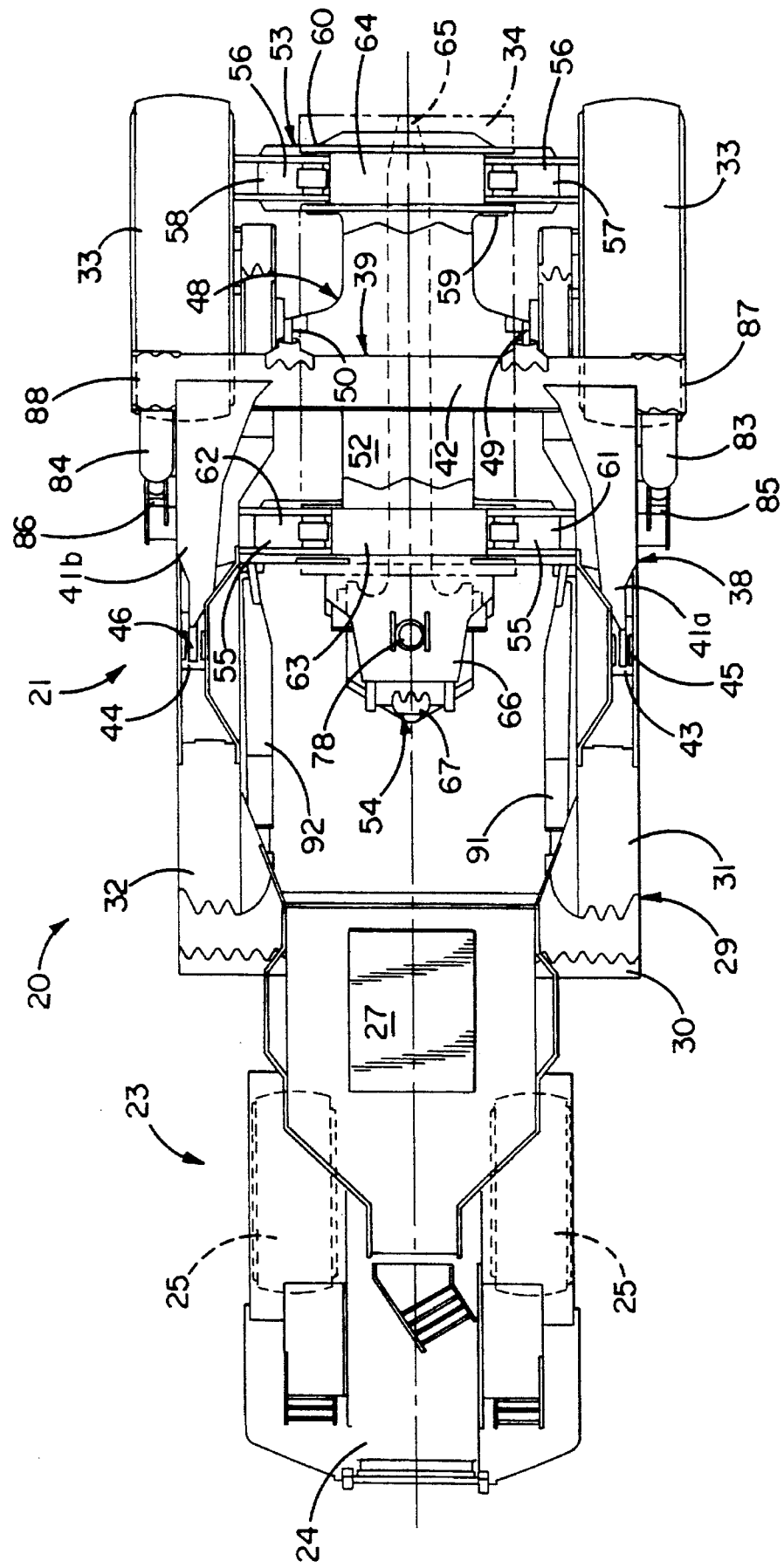
FIG. 2 is a plan view of the vehicle shown in FIG. 1.
Figure 3:
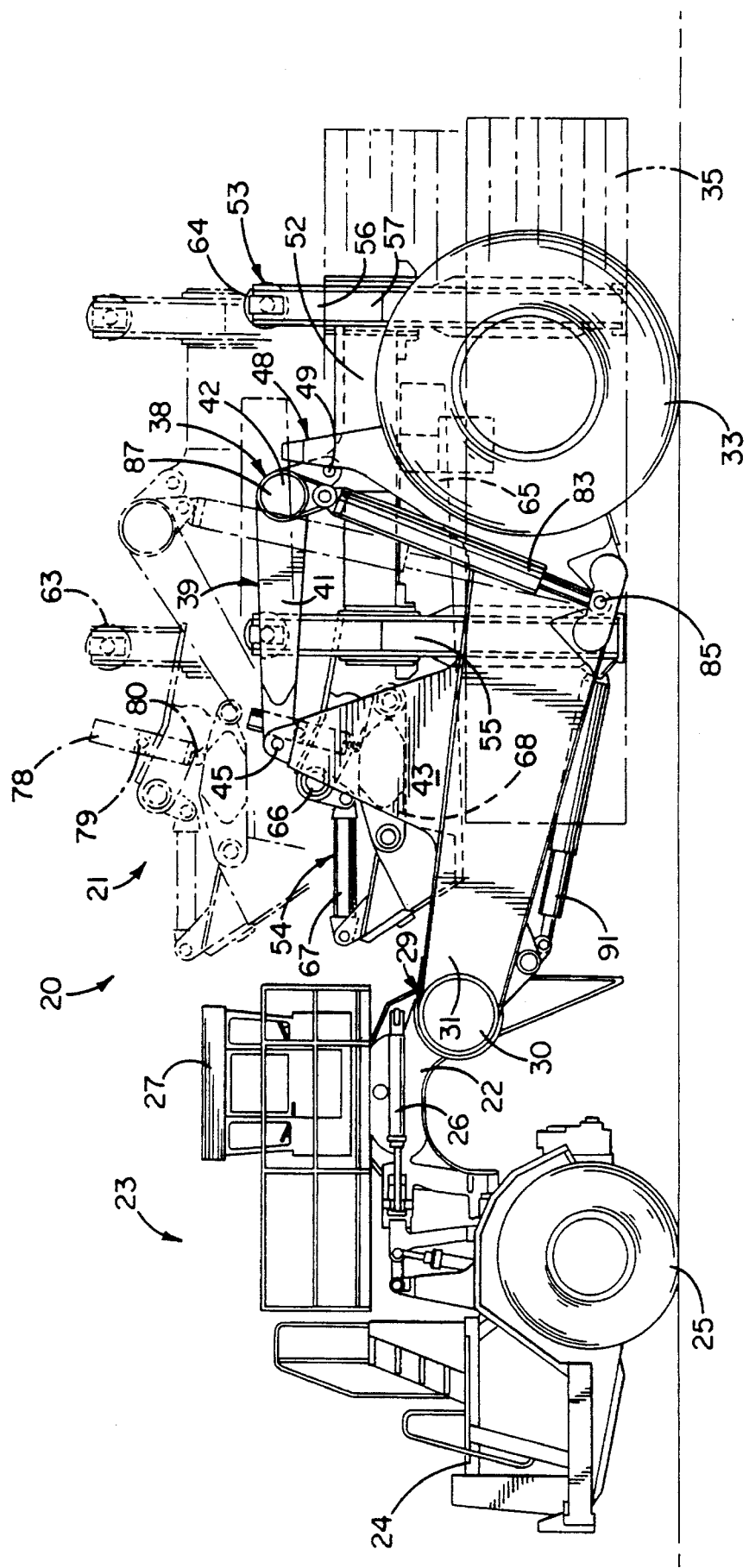
FIG. 3 is a side elevational view of the vehicle illustrating the probe assembly in a raised position enabling the lifting mechanism to handle a slab-shaped load.
Figure 4:
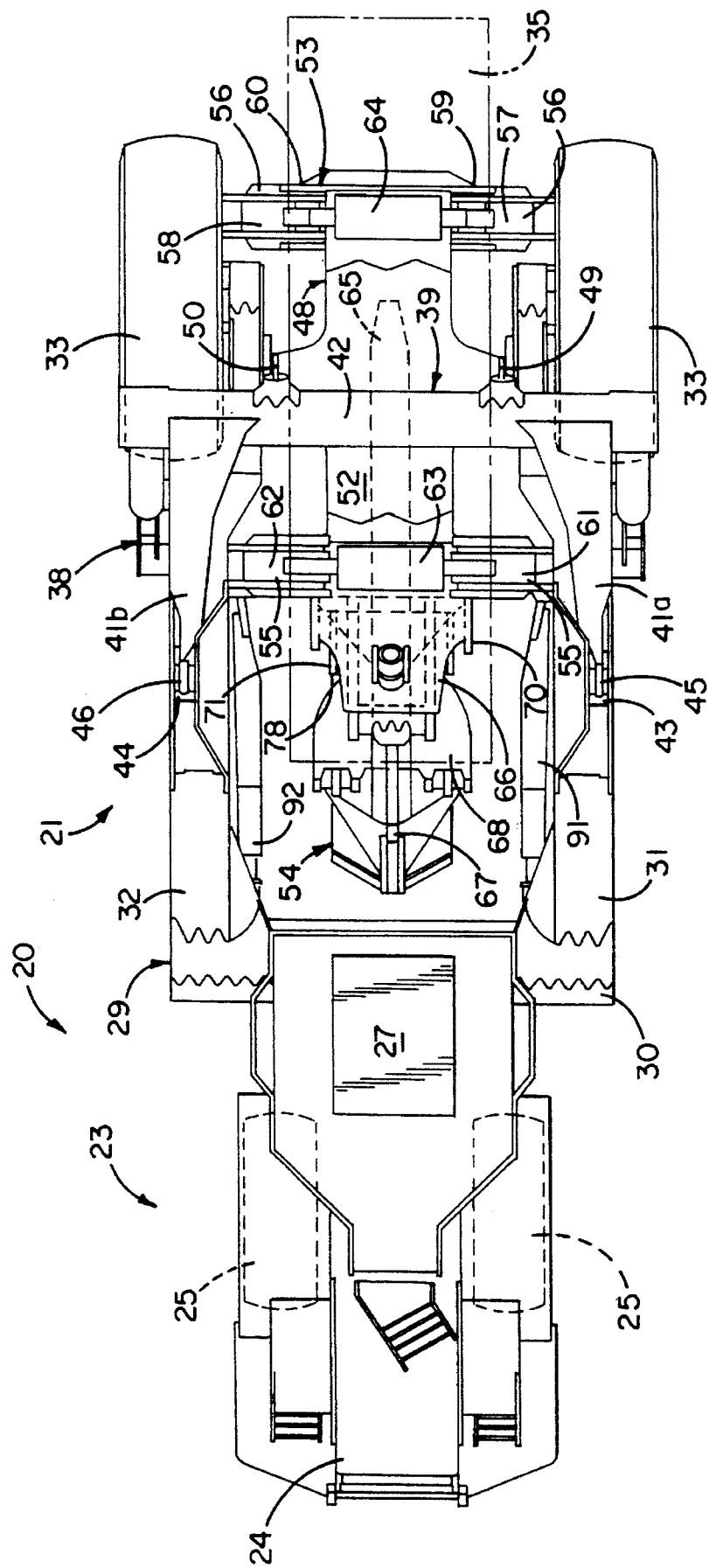
FIG. 4 is a plan view of the vehicle shown in FIG. 3.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention as expressed in the appended claims.

All of the references cited herein are hereby incorporated in their entireties by reference.

DETAILED DESCRIPTION OF THE PREFERRED EMBODIMENT

Turning now to the drawings and referring first to FIGS. 1–4, there is shown a vehicle 20 embodying the invention consisting of a trailer portion 21 coupled through a gooseneck 22 to a single axle prime mover 23 having an engine 24 and drive wheels 25. Steering actuators 26 connected between the gooseneck 22 and the prime mover 23 facilitate arcuately turning the prime mover 23 from side-to-side relative to the trailer portion 21, thus providing the assembly with steering capability. An operator's cab 27 including various controls is mounted on the gooseneck 22 of the vehicle 20.

The trailer 21 includes a rigid, generally straddle-type main frame 29 defined by a crossbeam 30 and a pair of rearwardly extending box-type support beams 31, 32. A pair of rear wheels 33 are connected to the box beams 31, 32, one to each beam at the rear thereof. The configuration of the main frame 29 is such that it provides a central load carrying space whereby the trailer 21 may be backed up to straddle a load to be handled. For purposes of illustration, the load is depicted in phantom as a steel coil 34 in FIGS. 1 and 2, and as a stack of steel slabs 35 in FIGS. 3 and 4.

For lifting and carrying the straddled load, a load lifting mechanism 38 is incorporated into the vehicle 20. As hereinafter described, the load lifting mechanism 38 has the capacity of engaging the load and elevating it, either for a sorting and stacking operation or for maintaining ground clearance during a transporting operation.

TO this end, the load lifting mechanism 38 includes a generally U-shaped lift frame 39 comprising a pair of longitudinally extending arms 41a, 41b connected together at their rearward ends by a crossbeam 42. The forward ends of the arms 41, 42 are pivotally connected to the main frame 29 via supports 43, 44, respectively, at transversely aligned points 45, 46. As a result, the forward end of the lift frame 39 is pivotally attached to the main frame 29, while the other end is free to be raised and lowered relative thereto.

To engage straddled loads for lifting, the lifting mechanism 38 further includes a lift assembly 48. The lift assembly 48 is pivotally coupled to the lift frame 39 at transversely aligned points 49, 50, i.e., near the free end of the lift frame 39 such that raising and lowering of the lift frame 39 raises and lowers the lift assembly 48.

In accordance with one aspect of the invention, as best shown in FIGS. 5–11, the lift assembly 48 includes a lift table 52 coupled to a tong assembly 53 for engaging loads that are suitable for clamping, such as slab-shaped loads or loads supported on a bolster or pallet. The lift table 52 is also coupled to a probe assembly 54 for engaging loads that are suitable for penetrating, such as coil-shaped loads or other loads having a longitudinal opening therethrough. As described in more detail below, the probe assembly 54 may be positioned between a first, lowered position to penetrate and carry coils, and a second, raised position which substantially removes the probe from the load-carrying space thereby enabling the vehicle 20 to operate as a slab carrier.

Figure 7:
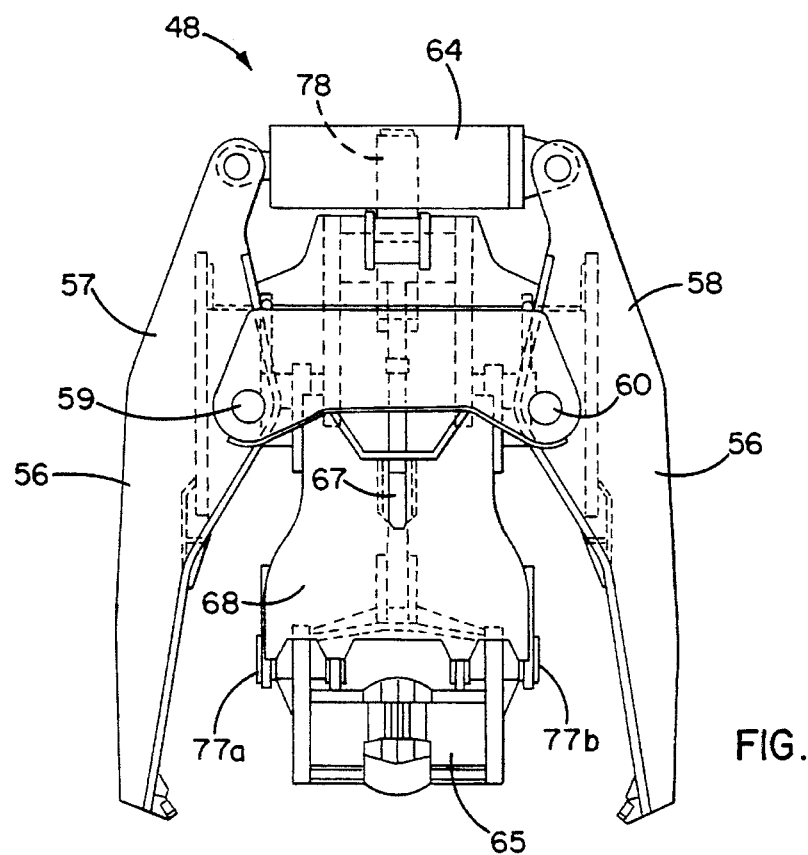
FIG. 7 is a rear elevational view of the lift frame shown in FIGS. 5 and 6.
Figure 8:
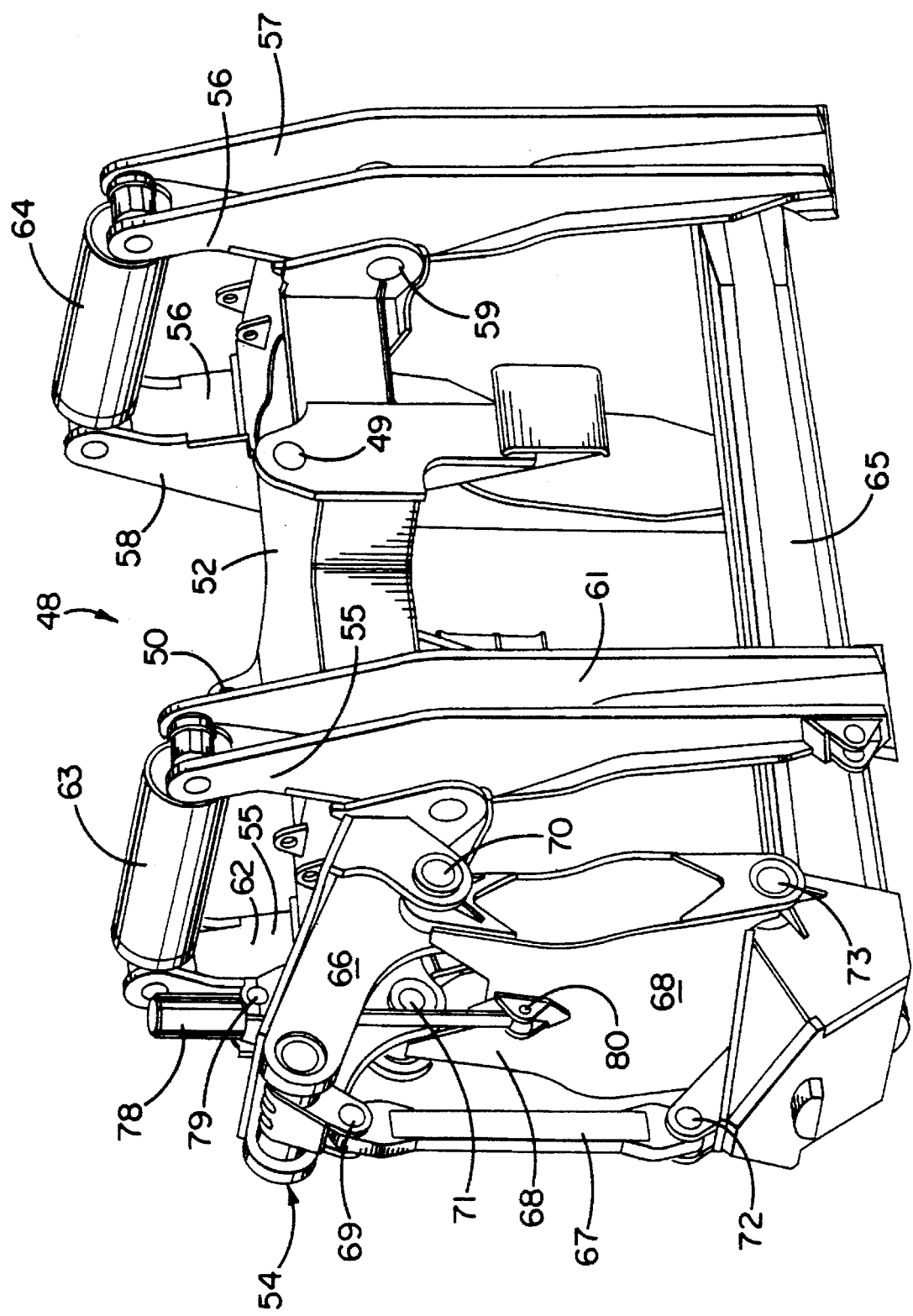
FIG. 8 is a perspective view of the lift frame shown in FIGS. 5–7.
Figure 11:
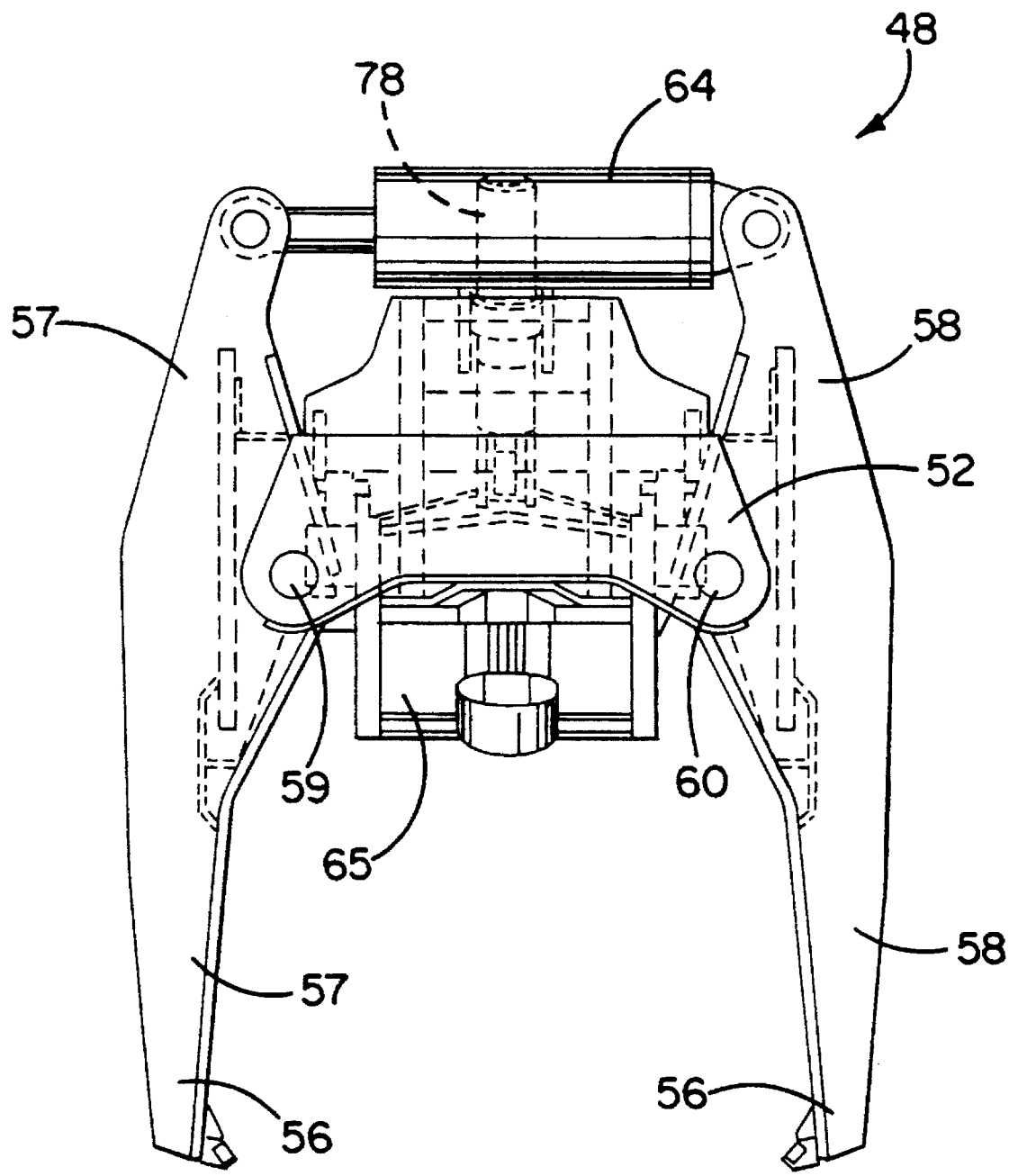
FIG. 11 is a rear elevational view of the lift frame shown in FIGS. 9 and 10.

To clamp loads that are deemed suitable for clamping, the tong assembly 53 is preferably comprised two sets of substantially identical, depending tong pairs 55, 56 mounted to the lift table 52. As best shown in FIGS. 7 and 11, the rear pair of tongs 56 is comprised of two members 57, 58, which are pivotally mounted near their central portions to the rearward end of the lift table 52 at points 59, 60. The front pair of tongs 55 is comprised of members 61, 62 which are mounted near the forward end of the lift table 52 in a similar manner. As a result of this configuration, the lower ends of the tong members 57, 58 and 61, 62 and are adapted to squeeze against and grip a straddled load when their corresponding upper ends are forced apart. Conversely, when the upper ends are drawn together, the lower ends are separated thereby effectively opening the load carrying space into which a load may be entered, ordinarily by backing the trailer 21 over the load to straddle it.

To provide the force necessary to open or close the lower ends of the tongs, front and rear hydraulic clamping actuators 63, 64 are pivotally coupled to the upper ends of their corresponding front and rear tong pairs 55, 56, respectively. As described in more detail below, appropriate extension and retraction of these actuators 63, 64 controls the tong operation. As can be appreciated, the specific configuration and dimensions of the tong assembly 53 may be varied to suit a particular application, depending on the nature of the load including its size, weight, characteristics and so on.

Turning now to a consideration of the mechanism for engaging loads that are suitable for penetrating, as best shown in FIGS. 5–11 the probe assembly 54 comprises a longitudinally extending probe 65 for penetrating and supporting such loads. In the preferred embodiment described herein, the probe 65 extends rearwardly and is tapered at its rearward end to facilitate the penetration. In keeping with the invention, the probe 65 is arranged to be displaceable relative to the lift table 52 in a manner that allows the probe 65 to be positioned within the load carrying space to penetrate loads as they enter the space, or to be substantially withdrawn from the load carrying space such that the vehicle 20 operates as previously described to function as a slab carrier.

To this end, the probe 65 is pivotally coupled to a mounting structure 66 via a pair of parallel links 67, 68. The mounting structure 66 is rigidly mounted to the forward end of the lift table 52, such as by welding, attaching thereto with fasteners or the like, or by forming a unitary structure combining the mounting structure 66 with the lift table 52 at the time of manufacture.

The pair of links comprises a front link 67 and rear link 68. The front link 67 is pivotally coupled at one end to the mounting structure 66 at pin 69, while the rear link 68 is pivotally coupled at one end thereof to the mounting structure 66 at transversely aligned pins 70, 71. At the opposite end, the front link 67 is pivotally coupled to the probe 65 at pin 72, while the opposite end of the rear link 68 is pivotally coupled to the probe 65 at transversely aligned pins 73, 74.

Figure 5:
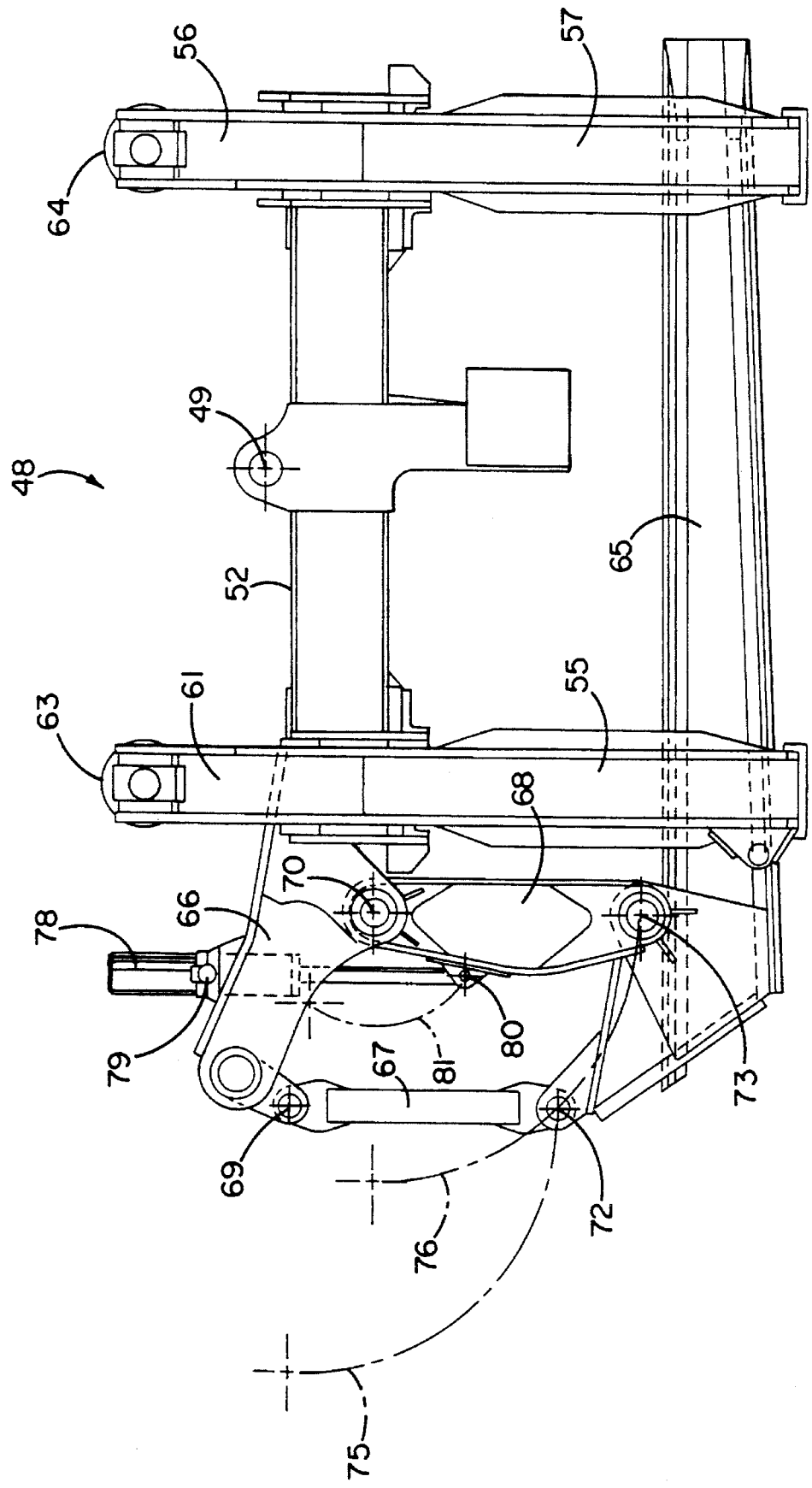
FIG. 5 is a fragmentary side elevational view of the lift frame of FIG. 1 illustrating the probe for inserting into a coil when in the lowered position.
Figure 6:
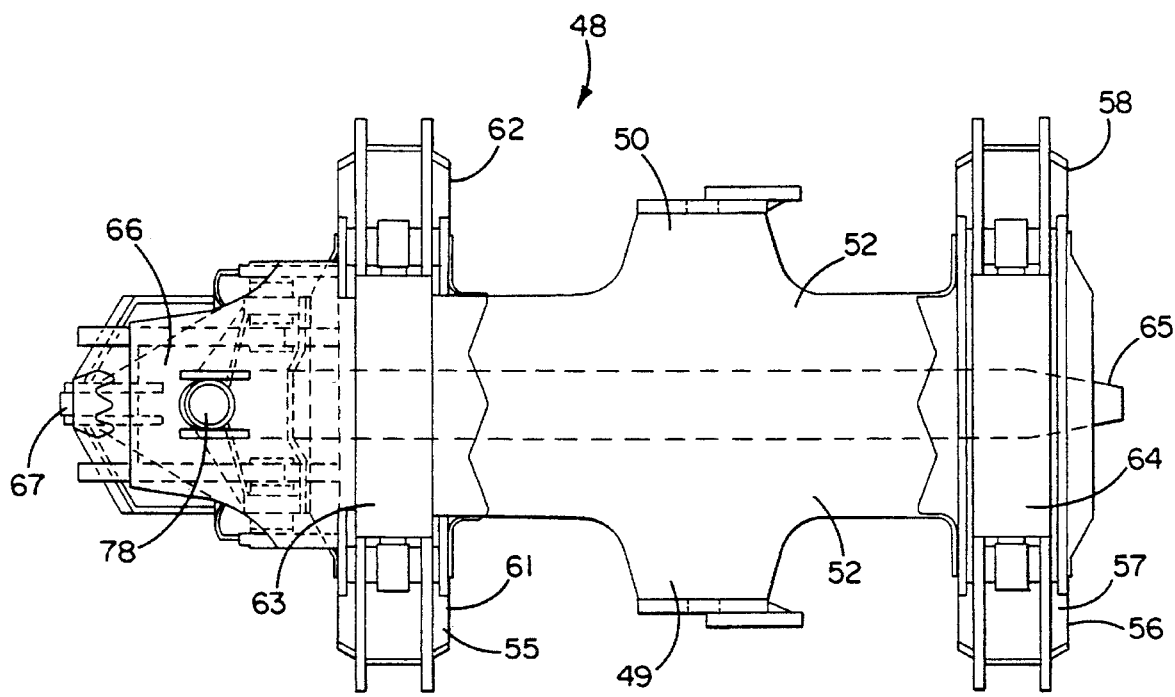
FIG. 6 is a plan view of the lift frame shown in FIG. 5.
Figure 9:
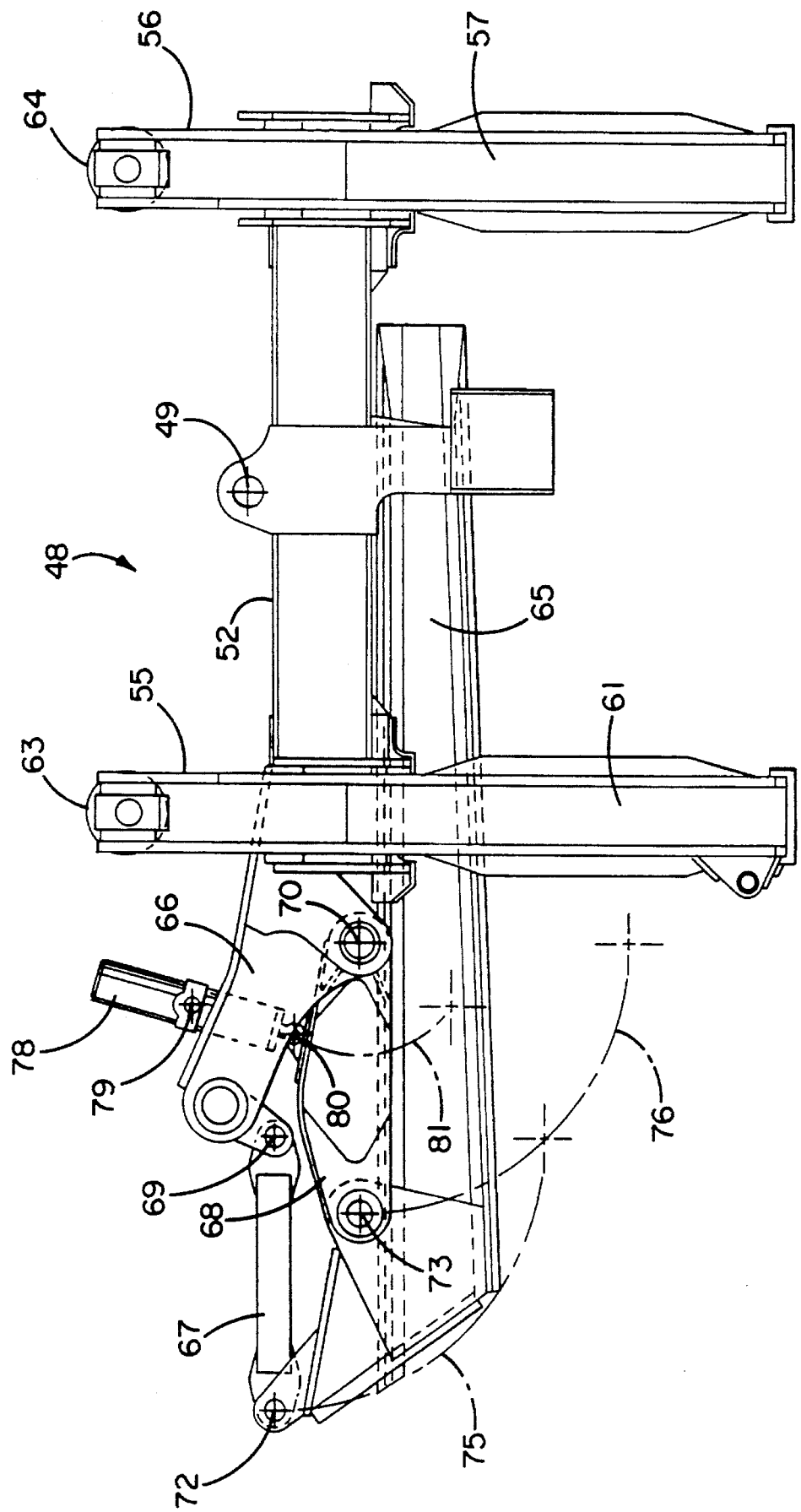
FIG. 9 is a fragmentary side elevational view of the lift frame illustrating the probe in the raised position.
Figure 10:
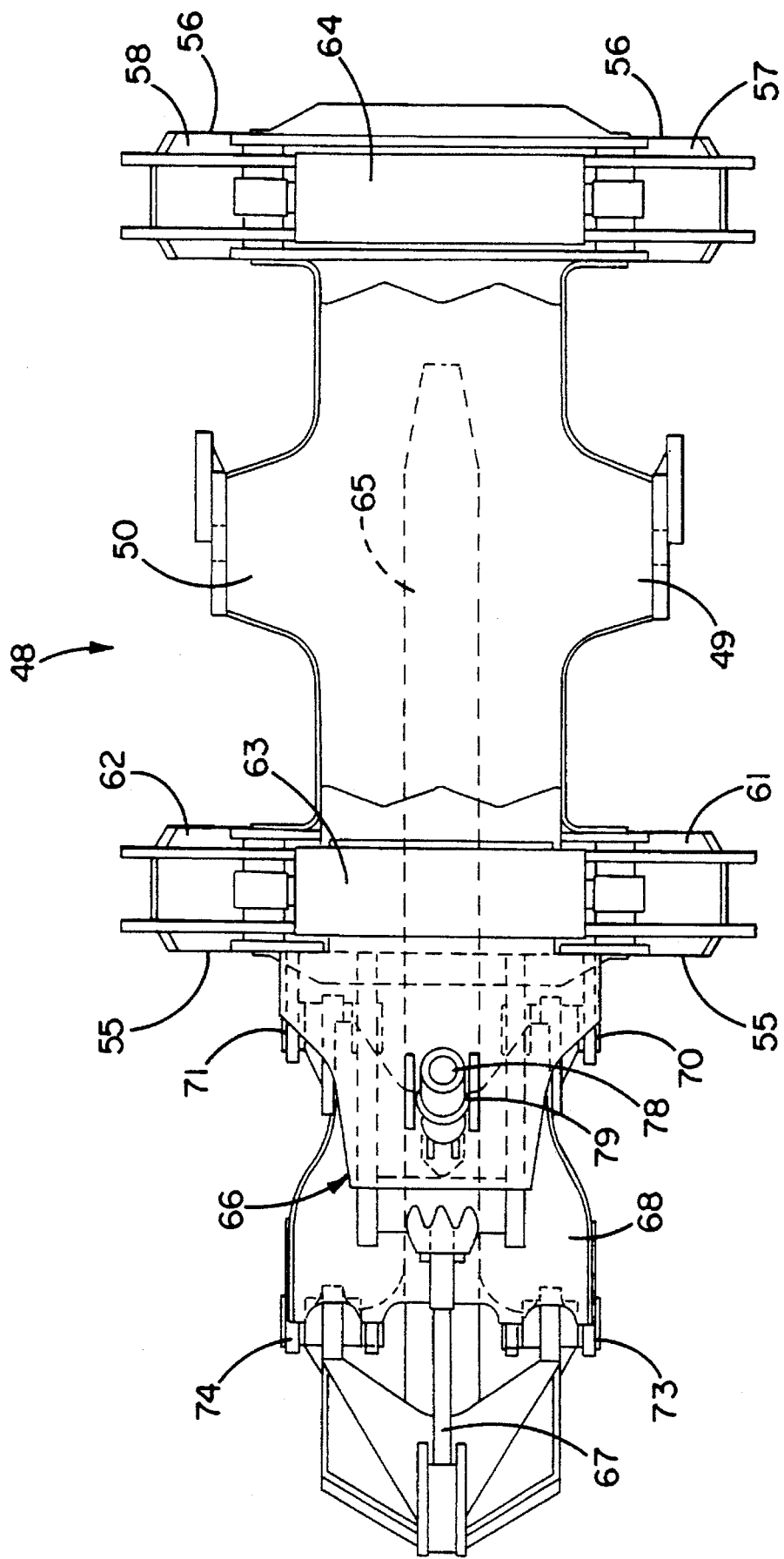
FIG. 10 is a plan view of the lift frame shown in FIG. 9.

As a result of these pivotal connections, as best shown in FIGS. 5 and 9, pin 72 is displaceable along the arc represented by broken line 75, while pins 73, 74 are displaceable along the arc represented by broken line 76. Thus, the probe 65 may be pivoted downwardly, i.e., lowered into the load carrying space as best shown in FIG. 5, or pivoted upwardly i.e., raised to an extreme elevated position that is substantially withdrawn from the load carrying space as best shown in FIG. 9. According to one aspect of the invention, the positioning of the probe 65 enables the vehicle 20 to be employed either as a coil carrier (lowered probe) or as a slab carrier (raised probe).

To raise and lower the probe 65 relative to the lift table 52, a hydraulically operated probe cylinder and piston combination 78 is connected between the pivotable rear link 68 and the mounting structure 66. In the illustrated embodiment, the probe cylinder 78 is trunnion mounted at its head end to the mounting structure 66 at pin 79, thus allowing the cylinder 78 to pivot, and is pivotally connected at its piston rod end to the rear link 68 at pin 80. With this configuration, retracting the piston rod of the probe cylinder 78 pivots pin 80 coupled to the rear link 68 upwardly along the arc represented by broken line 81 in FIGS. 5 and 9, thereby raising the probe 65, while extending the piston rod pivots the rear link 68 downwardly along the same arc 81 thereby lowering the probe 65 into the load carrying space. Appropriate operation of the probe cylinder 78 is described in more detail below.

Turning now to a consideration of the raising and lowering of the lift frame 39, and consequently the raising and lowering of the tong assembly 53 and probe assembly 54, as shown in FIGS. 1–4 the lifting mechanism 38 further includes a pair of hydraulic actuators, or lift cylinders 83, 84, trunnion mounted at their piston rod ends to the main frame 29 at transversely aligned pins 85, 86, respectively. The head ends of the cylinders 83, 84 are pivotally connected near the ends of the crossbeam 42 at transversely aligned points 87, 88. With the arrangement shown, the simultaneous extension or retraction of the pistons of cylinders 83, 84 pivot the cylinder 78 such that pins 87, 88 travel along the arc represented by broken line 89, while pins 49, 50 follow the arc represented by broken line 90. Accordingly, upon extension the lift table 52 is pivoted upwardly along with the attached probe assembly 54 and tong assembly 53, thereby lifting an engaged load. It will be appreciated that the sizing of the cylinders 83, 84, as well as their specific points of attachment to the main frame 29 and the lift frame 39, are dependent upon many factors, including, among others, the contemplated sizes of the loads, the weights thereof, and the required lifting height.

In order to prevent free pivotal movement of the lift table 52 relative to the lift frame 39 about the axis defined by the pivot points 49, 50, a pair of drag links 91, 92 are connected between the main frame 29 and the tong assembly 53. The drag links 91, 92, which preferably comprise hydraulic cylinder and piston combinations, function to maintain the lift table 52 in the same orientation relative to the main frame 29 regardless of the elevation of the lift frame 39. To this end, the drag links 91, 92 are connected such that when viewed in the side elevation (FIGS. 1 and 3), their points of connection when considered with the pivot points 45 and 49 (or 46 and 50) essentially define a parallelogram. Once the lift table 52 has been elevated, the drag links 91, 92 may be extended or retracted as needed to establish (or maintain) the parallelogram relationship. A similar drag link that is likewise adjustable to maintain such a parallelogram relationship while providing other benefits applicable to the present invention is described in U.S. Pat. Nos. 4,488,848 and 4,601,630.

Turning now to an explanation of the operation of the invention, the operator first must select the appropriate position for the probe 65 based on the type of load to be handled. If the intended load is one suitable for clamping, the operator opens the tong pairs 55, 56 to expose the load carrying space and actuates the probe cylinder 78 to retract its piston, assuming it is not already in a retracted position. Both of these steps may be performed by operator control of a hydraulic control circuit as described in more detail below.

As the probe cylinder and piston combination 78 is retracted, the rear link 68 is pulled to a horizontal position which swings the probe 65 and front link 67 upwardly into the position shown in FIGS. 3–4 and 9–11. At this time, the probe 65 is at an extreme elevated position, which is substantially above and therefore withdrawn from the load carrying space exposed by the open tong pairs 55, 56, and the vehicle 20 is configured to operate as a slab carrier.

To engage the load with the tong pairs 55, 56, as described above, the load is first straddled by backing the trailer 21 over it until the depending tong pairs 55, 56 are in an appropriate longitudinal position. When so positioned, the lift frame 39 is subsequently lowered by operating the lift cylinders 83, 84 to raise or lower the lift table 52 until the lower ends of the tong pairs 55, 56 achieve the desired height for engaging the load. As described in more detail below, the tong pairs 55, 56 are then actuated to clamp the load by controlling the hydraulic circuit to extend the tong actuators 63, 64. Next, the lift cylinders 83, 84 are operated to elevate the lift frame 39 (and consequently the tong pairs 55, 56 and the load clamped thereby) to a desired height for transporting. The vehicle 20 is then driven to transport the load to a desired location.

Alternatively, if the load to be handled is one suitable for penetrating, such as the steel coil 34, the probe 65 is swung downwardly into its lowered position by extending the probe cylinder 78 until the links 67, 68 are substantially vertical such that the probe 65 is fully supported by the links 67, 68. The lift frame 39 is then raised or lowered as needed until the probe 65 is sufficiently aligned vertically with the center of the coil 34. Of course, the tong pairs 55, 56 are also open at this time to expose the necessary load carrying space.

After the vertical alignment has been completed, the trailer 21 is backed up until the probe 65 penetrates the center opening of the coil 34 and the coil 34 is appropriately positioned on the probe 65 in the longitudinal direction. Once so positioned, the lift cylinders are operated to elevate the lift frame 39 (and consequently the probe assembly 54 and coil 34 supported thereby) to a desired height for transporting. The vehicle 20 is then driven to carry the coil 34 to a desired location.

Preferably, the tong pairs 55, 56 are automatically disabled whenever the probe 65 is in its lowered position, such as by arranging the hydraulic circuit to automatically retract the tong actuators 63, 64 whenever the probe cylinder 78 is extended to lower the probe 65. However, in an alternative arrangement, one or both of the tong pairs 55, 56 may be actuated to grip the probe 65 prior to lifting the coil-shaped load, so that at least some of the weight of the load will be borne by at least one of the tong pairs 55, 56 rather than entirely by the probe 65 and its supporting links 67, 68. Of course, this assumes that the coil-shaped load is of a length allowing it to fit into the load carrying space without obstructing the access of the tongs to the probe 65.

It can be readily appreciated that the sizes of the various components described herein, including the probe, the links, the lift mechanism and other probe assembly components are selected according to the specifications of the load to be carried and may be varied accordingly. For example, one such vehicle, commercially available from Kress Corporation, Brimfield, Ill., Model No. SCC 300, is designed to carry up to 300,000 pounds, having a probe attachment weighing approximately 15 tons.

Moreover, while the tractor-trailer arrangement described herein provides a particularly well-suited type of vehicle in which to implement the invention, it can be readily appreciated that the lifting mechanism 38 may be mounted on other straddle-type load carrying vehicles, such as the self-propelled straddle carrier described in U.S. patent application Ser. No. 08/055,815 U.S. Pat. No. 5,368,434 filed Apr. 30, 1993, and assigned to the same assignee as the present invention. To this end, the lifting mechanism 38 may be constructed and dimensioned to conform to the specifications of the particular underlying vehicle. For example, in the self-propelled straddle carrier, the probe may be oriented so as to penetrate a coil by driving the vehicle forwardly rather than rearwardly, since that particular vehicle is capable of straddling a load from either direction.

As an added benefit, the probe and its components may be implemented in an entirely new vehicle or retrofit to an existing slab carrying vehicle. This is primarily because in at least one design the probe assembly 54 is capable of being mounted to the forward end of existing lift tables.

It can be readily appreciated that such loadhandling vehicles often must conform to certain height, length and width requirements when doors and other structures impose maximum height and width limitations. By arranging the probe assembly 54 as described herein, i.e., such that the links are arranged to swing to a horizontal position when the probe 65 is retracted to its maximum elevation, the height (and other) dimensions of the vehicle are not increased by the addition of the probe assembly 54. Thus, the illustrated design of the present invention has the advantage of providing a high lifting capability for sorting, stacking, etc, while maintaining the low overall height during the transporting operation that is currently available with dedicated slab carriers.

Figure 12:
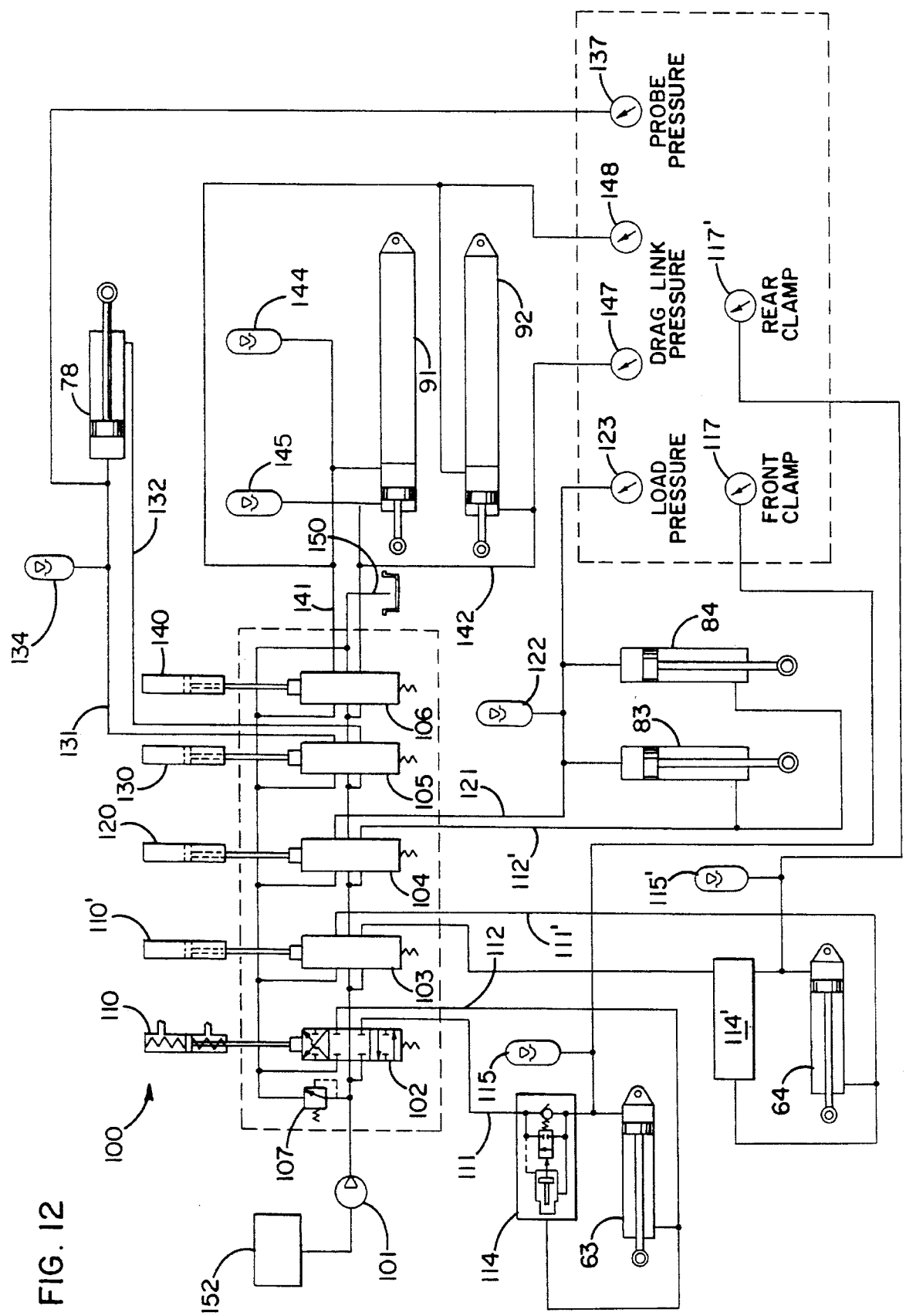
FIG. 12 is a schematic of a hydraulic system which may be employed to control the embodiment of the invention described in FIGS. 1–11.

Turning to a consideration of the hydraulics for operating the various cylinders, the design according to the present invention may be controlled with a relatively simple and reliable control circuit, such as the one shown schematically as circuit 100 in FIG. 12. In general, the control circuit 100 contemplates manually operated pneumatic controls to selectively actuate the probe cylinder 78, the lift frame cylinders 83, 84, the rear tong assembly cylinder 64, the front tong assembly cylinder 63, and the drag link cylinders 91, 92. Similar hydraulic components are described in detail in U.S. Pat. Nos. 4,170,434, 4,488,848 and 4,601,630. Notwithstanding, it can be appreciated that electronic circuitry, including microprocessor-controlled circuitry, may alternatively be employed to operate the pneumatic controls.

AS shown in FIG. 12, a hydraulic pump 101 delivers hydraulic fluid under pressure to five three-position spool valves 102–106, which independently control the operation of the aforementioned actuating cylinders. A relief valve 107 located between the pump output and the spool valves 102–106 limits system pressure.

In keeping with the invention, to control the clamping and unclamping of a load with the front tong pair 55, the three-position hydraulic spool valve 102, associated with the front tong assembly cylinder 63, is normally held in the off position by a double-acting spring-centered pneumatic feathering cylinder 110. To control the actuation of the feathering cylinder 110, a manually-operated or electrically-operated pneumatic valve (not shown) may be selectively operated to provide pressurized air to one or the other of the feathering cylinder 110 ports, shifting the internal piston and, in turn, actuating the hydraulic spool valve 102. Pressurized hydraulic fluid from the pump 101, which normally passes through the valve 102 and is available to any of the successive valves 103–106 when the former is in a neutral condition, is routed through the spool valve 102 to either line 111 or 112, depending on whether a clamping or unclamping action is desired from the corresponding tong pair 55. When the line 111 is pressurized, hydraulic fluid is supplied to pilot-actuated check valve assembly 114 (shown schematically) before entering the cylinder 63. The check valve 114 is arranged such that pressurized fluid in line 111 can freely pass through the check valve assembly 114 into the chamber at the piston head end of the front cylinder 63, but can exit therefrom only when the pressure in line 112 exceeds that in line 111 by a predetermined minimum. This feature assures against inadvertent unclamping of the load, as might otherwise occur when spool valve 102 is returned to its neutral position or in the event of a hydraulic failure upstream of the check valve 114.

The flow of pressurized hydraulic fluid into the chamber at the piston head end of hydraulic cylinder 63 forces its actuator arm (piston rod) to the left in FIG. 12, which in turn causes a clamping action of the front tong pair 55 as described previously. After the load has been clamped, absent pressure in line 112, the fluid within the chamber at the piston head end will maintain the cylinder 63 in an extended position. A hydraulic accumulator 115 is incorporated between the check valve assembly 114 and the cylinder 64 to serve a shock absorbing function and to provide a pressurized source of hydraulic fluid to maintain the pressure in the head end chamber. A pressure gauge 117 in the operator's cab may be employed to provide a visual indication of the clamping pressure.

The hydraulic circuitry associated with the rear clamp cylinder 64 is configured and operated identically to the hydraulic circuitry of the front clamp cylinder 63, and therefore is not separately described herein in detail. For ease of understanding, corresponding rear tong control components in FIG. 12 have been assigned similar numbers to the front components, e.g., the rear feathering cylinder 110' corresponds to front feathering cylinder 110, with the exception of spool valve 102 and the front clamp cylinder 63 which correspond to spool valve 103 and rear clamp cylinder 64, respectively.

Continuing with the description of the illustrated control circuit 100 with respect to the 17 lifting of the lift frame 39, the lift cylinders 83, 84 are simultaneously controlled by operation of a single feathering cylinder 120 to activate the hydraulic spool valve 104. A single manually or electrically operated pneumatic valve (not shown) is provided for selective operation of the feathering cylinder 120. For the lifting operation, line 121 is charged with hydraulic fluid routed through the valve 109 and directly into the piston head ends of the lift cylinders 83, 84. As is apparent, hydraulic fluid pressure in line 121 acting on the cylinder pistons causes the simultaneous extension of the actuator arms thereof, thereby lifting the lift frame 39 and any engaged load. Conversely, hydraulic pressure acting on the piston rod ends (as influenced by gravity) lowers the lift frame 39 and any engaged load.

In certain circumstances, such as in the case of a load which is not evenly distributed from side-to-side, the parallel arrangement of the lift cylinders 83, 84 may result in a somewhat uneven extensions thereof. This may be readily accommodated by constructing the lift frame 39 to permit a limited amount of twisting. Inasmuch as the cylinders 83 and 84 are hydraulically and mechanically interconnected, their retraction under the weight of the load, whether intentional or the result of an unexpected hydraulic failure, will be substantially simultaneous. A hydraulic accumulator 122 provides a shock-absorbing function, which is beneficial when the vehicle 20 is carrying a load over rough or uneven terrain. A pressure gauge 123 in the operator's cab 27 may be provided to indicate the pressure on the lift cylinders 83, 84, providing an indication of the magnitude of the load.

In keeping with the invention, the probe cylinder 78 is selectively controlled with a similar manually-operated or electrically-operated pneumatic valve (not shown) which controls a pneumatic feathering cylinder 130, which in turn controls the three-position hydraulic spool valve 105. Pressurized hydraulic fluid from the pump 101, which is available to the valve 105, is routed through the spool valve 105 to either line 131 or 132, depending on whether the operator desires to extend the probe cylinder 78 (lowered probe position for penetrating coils) or to retract the probe cylinder 78 (raised probe position for clamping slabs). When the line 131 is pressurized, hydraulic fluid is supplied to the piston head end of the cylinder 78 to extend the rod. Conversely, pressure in line 132 retracts the piston rod. As described previously, the extension of cylinder 78 lowers the probe into the load carrying space, while retraction of the cylinder raises the probe out of the load carrying space. As can be appreciated, the weight of the probe 65 also attempts to lower the probe 65.

After the load has been positioned, absent pressure in line 132, the fluid within the chamber at the piston head end maintains the cylinder 78 in an extended position. A hydraulic accumulator 134 is provided to serve a shock absorbing function and to maintain the pressure in the piston head end chamber. A pressure gauge 137 in the operator's cab may be employed to provide a visual indication of the probe pressure, thereby providing a visual indication of the probe position.

The configuration and operation of the adjustable drag links 91, 92 is similar to that of the single drag link described in U.S. Pat. Nos. 4,488,848 and 19 4,601,630 except that a pair of parallel links are provided herein. Thus, as with the control of the clamping and lift cylinders, a manually operated pneumatic valve (not shown) provides pressurized air to the feathering cylinder 140 to selectively actuate the hydraulic spool valve 106. To increase the length of the drag links (which comprise hydraulic cylinders) 91, 92, line 141 is pressurized with hydraulic fluid which is routed through valve 106 to the piston head ends of the drag links 91, 92. This moves the rods leftward in FIG. 12. Hydraulic fluid forced out of the piston rod ends when the piston are moved leftward returns through the spool valve 106 and to the fluid return line 150 of hydraulic reservoir 152. A hydraulic accumulator 144 is associated with line 141 to absorb any surges in hydraulic fluid pressure due to inadvertent impacts on the lift assembly 48 being transmitted as a compressive force on the drag links 91 and 92.

In a similar manner, the length of the drag links 91, 92 may be shortened by activating the spool valve 106 to pressurize line 142. As hydraulic fluid under pressure fills the rod end chambers, the pistons are moved rightward in FIG. 12, forcing any fluid in the piston head end chamber to return through line 141, through the spool valve 106, and eventually to the reservoir 152. A hydraulic accumulator 145 is associated with line 142 to absorb impacts which are transmitted to the drag links 91, 92 as tensile forces.

Pressure gages 147, 148 may be located in the operator's cab 27 for visual indication of the hydraulic pressure in lines 142, 141 respectively. Since the purpose of the drag link is simply to maintain the lift assembly 48 and any engaged load in the position they tend to assume on their own due to gravity, under ideal conditions the links 91, 92 should be neither under tension nor compression. Under such circumstances, the pressure reading on gages 147 and 148 should be substantially equal, near zero. If, however, the pressure readings on gages 147 and 148 are significantly different, it is an indication that the load may be improperly balanced fore to aft and should be adjusted accordingly.

As can be seen from the foregoing detailed description, there is provided an improved load handling apparatus that is suitable for handling an increased variety of heavy loads including slab-shaped and coil-shaped loads. The apparatus rapidly transforms to function as either a slab carrier or a coil carrier according to the type of load to be handled. In addition, the apparatus may be incorporated into several different types of load-handling vehicles, and may even be retrofit to existing slab carrying vehicles. Further, the present apparatus is capable of maintaining the overall dimensions of existing slab carrying vehicles.

What is claimed is:

1. A load handling apparatus attached to a main frame of a vehicle for handling loads including a first type of loads suitable for being penetrated and a second type of loads suitable for being clamped when disposed in a load carrying space thereof, comprising, in combination, a lift frame, said lift frame being moveable relative to said main frame between a raised position and a lowered position, the difference in elevation of the lift frame relative to the main frame between said lowered and raised positions providing the lifting capability of the lift frame;

a tong assembly suspended from said lift frame for vertical movement up and down relative to said main frame, said tong assembly including at least one tong actuator and a pair of depending tongs for gripping and carrying one of said second types of loads disposed in the load carrying space;

a probe assembly connected to the lift frame for vertical movement up and down relative to said main frame, said probe assembly including a displaceable probe having a first position within the load carrying space and a second position substantially withdrawn from the load carrying space;

means for moving the probe between the first position for penetrating one of said first type of loads being entered into the load carrying space and the second position for avoiding said second types of loads disposed in the load carrying space;

means for actuating the tong assembly for clamping the depending tongs onto one of said second types of loads when disposed in the load carrying space; and means for actuating said lift frame to raise and lower the probe assembly and tong assembly relative to the main frame, thereby lifting and lowering the first and second types of loads in the load carrying space.

2. The load handling apparatus of claim 1 wherein the means for moving the probe between the first and second positions includes at least one hydraulic cylinder and piston combination and control means for the operation thereof.

3. The load handling apparatus of claim 2 wherein the probe assembly includes a pair of substantially parallel links pivotally coupled to the probe, and wherein one end of said piston and cylinder combination is connected to said tong assembly and the other end of said piston and cylinder combination is connected to one of said parallel links.

4. The load handling apparatus of claim 3 wherein the parallel links are displaced by operation of the cylinder and piston combination to a substantially vertical orientation to pivot the probe into the first position, and are displaced by operation of the cylinder and piston combination to a substantially horizontal position to pivot the probe into the second position.

5. The load handling apparatus of claim 3 wherein the parallel links and hydraulic piston and cylinder combination are disposed to minimize the overall dimensions of said vehicle.

6. The load handling apparatus of claim 1 wherein the probe assembly includes at least one link pivotally interconnecting the probe and the tong assembly.

7. The load handling apparatus of claim 1 wherein the second position is above the load carrying space, and the means for moving the probe between the first and second positions include means for pivoting the probe downwardly into the first position and for pivoting the probe upwardly into the second position.

8. The load handling apparatus of claim 1 further including means for longitudinally moving the lift frame relative to the load to enter the load into the load-carrying space.

9. The load handling apparatus of claim 8 wherein the means for actuating the tong assembly includes means for opening the tong assembly to avoid a load being entered into the load carrying space.

10. The load handling apparatus of claim 1 wherein the tong actuator comprises a hydraulic cylinder and piston combination and the means for actuating the tong assembly includes control means for the operation of said hydraulic cylinder and piston combination.

11. The load handling apparatus of claim 1 wherein the tong assembly comprises two distinct pairs of depending tongs, each pair having a corresponding tong actuator therefor.

12. The load handling apparatus of claim 11 wherein each tong actuator comprises a hydraulic cylinder and piston combination, and the means for actuating the tong assembly includes control means for simultaneous operation of said hydraulic cylinder and piston combinations.

13. The load handling apparatus of claim 1 wherein the control means controls the tong actuator to open the tongs concurrent with the movement of the probe into the first probe position.

14. The load handling apparatus of claim 1 wherein the depending tongs are dimensioned to clamp the probe subsequent to the movement of the probe into the first probe position.

15. The load handling apparatus of claim 1 wherein the load suitable for penetrating comprises a coil of metal having a center opening.

16. The load handing apparatus of claim 15 including means for adjusting the height of the probe until the probe is substantially aligned in a vertical direction with the center opening of the coil;

means for moving the vehicle longitudinally such that the probe penetrates the center opening of the coil and the vehicle straddles the coil; and means for elevating the probe to engage and lift the coil.

17. The load handling apparatus of claim 16 further including means for actuating at least one pair of tongs to clamp the probe.

18. The load handing apparatus of claim 16 further including means for moving the vehicle to transport the coil after the coil is engaged.

19. The load handling apparatus of claim 1 wherein the load suitable for clamping comprises a stack of metal slabs.

20. The load handling apparatus of claim 19 including means for moving the vehicle longitudinally such that the vehicle straddles the load;

means for adjusting the height of the tongs until the tongs are substantially aligned in a vertical direction to engage the load;

means for actuating the tongs to clamp the load; and means for elevating the tongs and the clamped load.

21. The load handing apparatus of claim 20 further including means for moving the vehicle to transport the clamped load.

22. The load handling apparatus of claim 1 wherein the load suitable for clamping comprises a stack of metal billets.

23. A penetrable coil carrying attachment for a load handling apparatus having a main frame, an elevatable lift frame with a tong assembly suspended therefrom, and lift means for actuating said lift frame, wherein the tong assembly has at least one pair of clampable tongs depending therefrom and includes means for unclamping said tongs to define a load carrying space and for clamping said tongs for gripping and carrying a clampable load, said penetrable coil carrying attachment comprising, in combination, a probe assembly connected to the lift frame for vertical movement up and down relative to said main frame, said probe assembly including a displaceable probe movable between a first substantially horizontal position within the load carrying space and a second substantially horizontal position above the load carrying space; and positioning means for moving said probe between the first position for penetrating a penetrable coil being entered into in the load carrying space and the second position for avoiding clampable loads disposed in the load carrying space;

whereby actuating said lift means to raise and lower the lift frame relative to the main frame raises and lowers the tong assembly and the probe assembly, thereby lifting and lowering clampable loads and penetrable coils, respectively, in the load carrying space.

24. The attachment of claim 23 wherein the probe assembly includes at least one link pivotally interconnecting the probe and the tong assembly.

25. The attachment of claim 23 wherein the positioning means includes at least one hydraulic cylinder and piston combination and control means for the operation thereof.

26. The attachment of claim 25 wherein the probe assembly includes a pair of substantially parallel links pivotally coupled to the probe, and wherein one end of said piston and cylinder combination is connected to said tong assembly and the other end of said piston and cylinder combination is connected to one of said parallel links.

27. The attachment of claim 26 wherein the parallel links are displaced by operation of the cylinder and piston combination to a substantially vertical orientation to pivot the probe into the first position, and are displaced by operation of the cylinder and piston combination to a substantially horizontal position to pivot the probe into the second position.

28. The attachment of claim 26 wherein the parallel links and hydraulic piston and cylinder combination are disposed to minimize the overall dimensions of the load handling apparatus.

29. The attachment of claim 26 wherein the load handling apparatus is incorporated into a vehicle, and wherein the parallel links and hydraulic piston and cylinder combination are disposed to minimize the overall dimensions of the vehicle.

30. The attachment of claim 23 wherein the second position is above the load carrying space, and the means for moving the probe between the first and second positions includes means for pivoting the probe downwardly into the first position and for pivoting the probe upwardly into the second position.

* * * * *

UNITED STATES PATENT AND TRADEMARK OFFICE
CERTIFICATE OF CORRECTION

PATENT NO. : 5,496,146
DATED : March 5, 1996
INVENTOR(S) : Thomas et al.

It is certified that error appears in the above-indentified patent and that said Letters Patent is hereby corrected as shown below:

In Column 3, line 27: "TO this" should read
--To this--.

In Column 7, line 33: "AS shown" should read
--As shown--.

In Column 9, line 20: "and 19 4,601,630" should read
--and 4,601,630--.

In Claim 1, Column 10, line 29: "said first type of" should read --said first types of--.

In Claim 13, Column 11, line 24: "of claim 1" should read --of claim 12--.

Signed and Sealed this

Twenty-seventh Day of August, 1996

Attest:

BRUCE LEHMAN

Attesting Officer   Commissioner of Patents and Trademarks